(12) United States Patent
Jung et al.

(10) Patent No.: US 10,539,217 B2
(45) Date of Patent: Jan. 21, 2020

(54) GEAR SUPPORT DEVICE OF AUTOMATIC TRANSMISSION

(71) Applicants: HYUNDAI MOTOR COMPANY, Seoul (KR); KIA MOTORS CORPORATION, Seoul (KR)

(72) Inventors: Jae Hun Jung, Incheon (KR); Jin Yong Kim, Incheon (KR); Yong Hoo Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/832,417

(22) Filed: Dec. 5, 2017

(65) Prior Publication Data

US 2018/0306304 A1    Oct. 25, 2018

(30) Foreign Application Priority Data

Apr. 21, 2017    (KR) .......................... 10-2017-0051441

(51) Int. Cl.
*F16H 57/023*    (2012.01)
*F16H 57/08*    (2006.01)
*F16H 57/00*    (2012.01)
*F16H 35/12*    (2006.01)
*F16F 15/12*    (2006.01)
*F16H 57/02*    (2012.01)

(52) U.S. Cl.
CPC ......... *F16H 57/0006* (2013.01); *F16H 35/12* (2013.01); *F16H 57/023* (2013.01); *F16H 57/082* (2013.01); *F16F 15/1206* (2013.01); *F16H 2057/02047* (2013.01)

(58) Field of Classification Search
CPC .... F16H 57/0006; F16H 57/082; F16H 35/01; F16H 57/237; F16H 2057/02047; F16H 15/1206; F16H 57/0427; F16H 57/0428
See application file for complete search history.

(56) References Cited

U.S. PATENT DOCUMENTS 3,858,698 A * 1/1975 Hause ................. F16D 25/0638
                                                                188/216
5,267,917 A    12/1993 Kadotani et al.
(Continued)

FOREIGN PATENT DOCUMENTS

JP    1995-180752 A    7/1995
JP    1998-131995 A    5/1998
(Continued)

*Primary Examiner* — Jacob S. Scott
*Assistant Examiner* — Lillian T Nguyen
(74) *Attorney, Agent, or Firm* — Brinks Gilson & Lione (57) ABSTRACT

A gear support device of an automatic transmission reduces vibration and noise that are generated in a planetary gear set when power is transmitted from a vehicle driving source. In particular, the gear support device includes a gear support which is disposed on an outer peripheral surface of a hub retainer coupled to a planetary gear set directly connected to an input shaft of a transmission. The gear support rotatably supports the hub retainer by contacting with the outer peripheral surface of the hub retainer at every predetermined interval in a circumferential direction of the hub retainer.

8 Claims, 9 Drawing Sheets

(56) References Cited

U.S. PATENT DOCUMENTS

| | | | | |
|---|---|---|---|---|
| 5,916,056 A | * | 6/1999 | Okada | F16H 63/3026 |
| | | | | 475/331 |
| 6,024,197 A | * | 2/2000 | Suwa | F16D 25/0638 |
| | | | | 192/48.92 |
| 7,080,721 B2 | | 7/2006 | Yamamoto et al. | |
| 2017/0089452 A1 | * | 3/2017 | Deutsch | F16D 13/52 |

FOREIGN PATENT DOCUMENTS

| | | |
|---|---|---|
| KR | 10-0222820 | 7/1999 |
| KR | 10-1232423 | 2/2013 |
| KR | 10-2015-0042431 | 4/2015 |

\* cited by examiner

GEAR SUPPORT DEVICE OF AUTOMATIC TRANSMISSION

CROSS REFERENCE TO RELATED APPLICATION

This application claims priority to and the benefit of Korean Patent Application No. 10-2017-0051441, filed on Apr. 21, 2017, which is incorporated herein by reference in its entirety.

FIELD

The present disclosure relates generally to a gear support device of an automatic transmission. More particularly, the present disclosure relates to a gear support device of an automatic transmission, the gear support device reducing vibration and noise that are generated in a planetary gear set when power is transmitted from a vehicle driving source.

BACKGROUND

The statements in this section merely provide background information related to the present disclosure and may not constitute prior art.

A transmission is a device that transmits power generated by a vehicle driving source such as an engine by appropriately converting the power into torque desired according to a travelling state. An automatic transmission is a transmission in which a gear is automatically operated according to a traveling speed without a manual operation of a driver.

Typically, an automatic transmission includes a plurality of planetary gear sets in order to transmit power supplied from a vehicle driving source. The automatic transmission includes a one-way clutch preventing a planetary gear set of the plurality of planetary gear sets from rotating in any one direction, the planetary gear set being connected to a transmission input shaft. The one-way clutch can prevent the planetary gear set from rotating in any one direction to permit power from being transmitted in a forward direction while preventing power from being transmitted in a reverse direction.

Torsion occurs in the planetary gear set when torque input to the transmission input shaft from the vehicle driving source is transmitted to the planetary gear set. The one-way clutch can prevent the occurrence of the torsion to stabilize the operation of the planetary gear set, thereby reducing vibration and noise caused by the torsion occurring in the planetary gear set.

However, since the one-way clutch is relatively expensive and heavy, the manufacturing costs and weight of a vehicle are increased. When the one-way clutch is removed, it is impossible either to shift a gear into a specific shift stage using the one-way clutch or to prevent the occurrence of the torsion of the planetary gear set, so that vibration and noise due to the operation of the planetary gear set are increased.

As described in Korean Patent Publication No. 10-2015-0042431, although the function of the one-way clutch for a gear shift (i.e. a function for preventing the reverse rotation of the planetary gear set) can be realized using an alternative technology, it is impossible to prevent the torsion of the planetary gear set. Therefore, it is difficult to remove the one-way clutch.

SUMMARY

The present disclosure provides a gear support device of an automatic transmission, in which a relatively inexpensive and light gear support able to support a planetary gear set is used instead of an existing one-way clutch to reduce costs and weight. The present disclosure also reduces vibration and noise caused by the operation of the planetary gear set by inhibiting torsion of the planetary gear set when power is transmitted from a vehicle driving source.

In one form of the present disclosure, a gear support device of an automatic transmission may include: a gear support disposed on an outer peripheral surface of a hub retainer coupled to a planetary gear set directly connected to an input shaft of a transmission. The gear support supports the hub retainer by contacting with the outer peripheral surface of the hub retainer at every predetermined interval in a circumferential direction of the hub retainer.

According to exemplary forms of the present disclosure, the gear support may have: a body configured to surround the outer peripheral surface of the hub retainer, and a plurality of support portions provided on an inner peripheral surface of the body to be in surface contact with the outer peripheral surface of the hub retainer.

In one form, the body may have mounting holes in the inner peripheral surface of the body, the mounting holes configured to allow the plurality of support portions to be mounted to the body. The plurality of support portions respectively have an insert block on one side thereof, the plurality of insert blocks being fitted into the mounting holes. In addition, each of the plurality of support portions may have a lubrication groove formed on a surface of the plurality of support portions. In particular, the surfaces formed with the lubrication groove are in surface contact with the outer peripheral surface of the hub retainer.

In addition, according to exemplary forms of the present disclosure, the body may have a guide rail provided on the inner peripheral surface thereof to inhibit the plurality of support portions from moving. The body may have a hollow portion between the inner peripheral surface and an outer peripheral surface of the body.

Furthermore, according to exemplary forms of the present disclosure, the body may have fixing portions to fix the body to a transmission housing. The fixing portions may include a plurality of fixing bosses disposed on an outer peripheral surface of the body to be spaced apart from each other. Among the plurality of fixing bosses, a distance between a first fixing boss and a second fixing boss, which is most adjacent to the first fixing boss, is different from a distance between other fixing bosses.

According to the gear support device according to the present disclosure, the inexpensive and light gear supports a hub retainer coupled to rotate with a planetary gear set. Accordingly, it is possible to reduce the torsion and the vibration of the planetary gear set generated when power is transmitted from a vehicle driving source, thereby reducing vibration and noise in the planetary gear set to the same level as in an existing one-way clutch. Accordingly, the gear support can substitute for the existing one-way clutch that is relatively expensive and heavy, thereby reducing the costs and the weight of an automatic transmission by the removal of the existing one-way clutch.

In addition, when the gear support is assembled to the outer peripheral surface of the hub retainer, a contact area with the hub retainer can be significantly reduced, compared to the existing one-way clutch, thereby improving fuel efficiency by reducing a power loss (i.e. a drag loss) caused by fraction with the gear support when the hub retainer rotates.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

First, an existing automatic transmission including a one-way clutch will be briefly described for a better understanding of the preset present disclosure.

Figure 6:
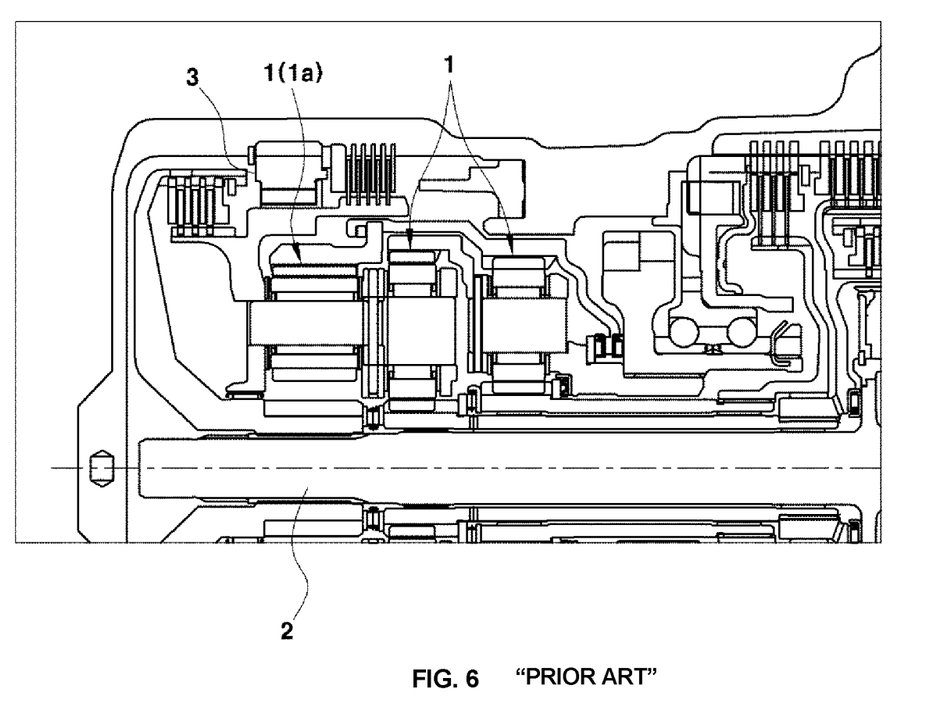
FIG. 6 is a partial configuration view illustrating an existing automatic transmission including a one-way clutch.

As illustrated in FIG. 6, the existing automatic transmission includes a plurality of planetary gear sets 1 in order to transmit power supplied from a vehicle driving source. The existing automatic transmission includes a one-way clutch 3 preventing a planetary gear set 1a of the plurality of planetary gear sets 1 from rotating in any one direction, the planetary gear set 1a being connected to an transmission input shaft 2.

The one-way clutch 3 can prevent the planetary gear set 1a from rotating in any one direction to block a reverse power transmission of the planetary gear set 1a and permit a forward power transmission of the planetary gear set 1a.

Torsion occurs in a carrier supporting planetary gears of the planetary gear set 1a when torque transmitted to the transmission input shaft 2 is input to the planetary gear set 1a. The one-way clutch 3 can prevent the occurrence of the torsion to stabilize the operation of the planetary gear set 1a, thereby reducing vibration and noise caused by the torsion generated in the planetary gear set 1a.

However, since the one-way clutch 3 is relatively expensive and heavy, the manufacturing costs and weight of a vehicle are increased. When the one-way clutch 3 is removed, shifting a gear into a specific shift stage using the one-way clutch 3 cannot be performed, and the occurrence of the torsion of the planetary gear set 1a may occur, so that vibration and noise due to the operation of the planetary gear set 1a are increased.

Although the function of the one-way clutch 3 (i.e. a function for preventing a reverse rotation of the planetary gear set 1a when a gear is shifted to a specific shift stage) is implemented using an alternative technology, it is difficult to prevent the occurrence of the torsion of the planetary gear set 1a when power is transmitted from the vehicle driving source. Thus, it is difficult to remove the one-way clutch 3.

According to the present disclosure, since a relatively inexpensive and light gear support able to rotatably and reliably support a planetary gear set is used instead of the relatively expensive and heavy one-way clutch 3, costs and weight can be reduced by the removal of the one-way clutch 3. In addition, the occurrence of torsion of the planetary gear set can be inhibited or prevented, thereby reducing vibration and noise caused by the operation of the planetary gear set 1a.

Figure 1:
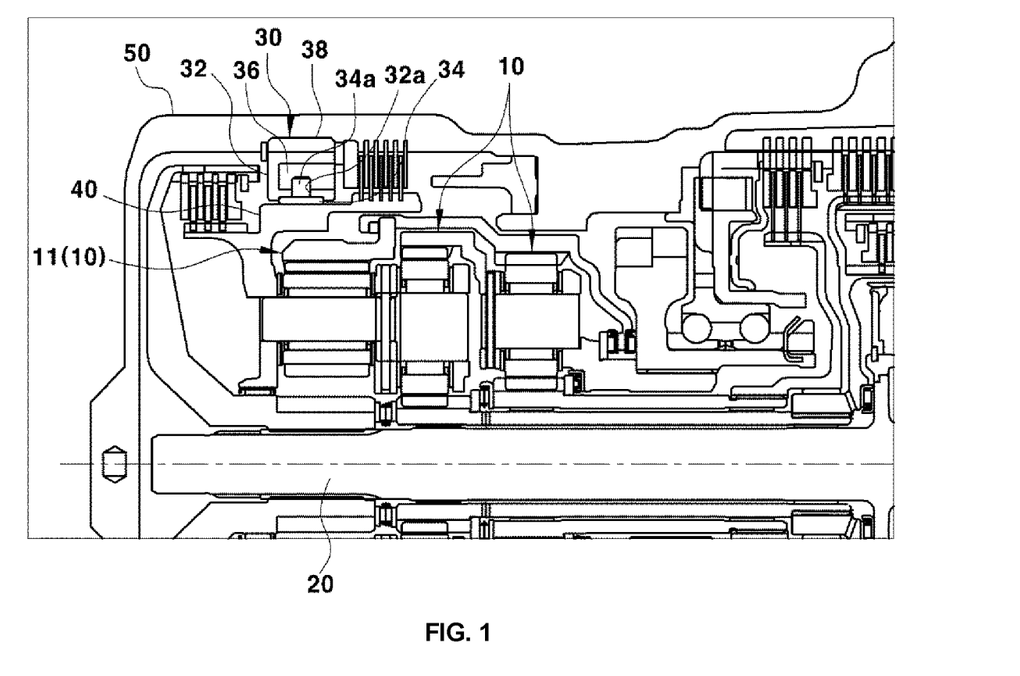
FIG. 1 is a partial configuration view illustrating an automatic transmission including a gear support according to an exemplary form of the present disclosure.
Figure 2:
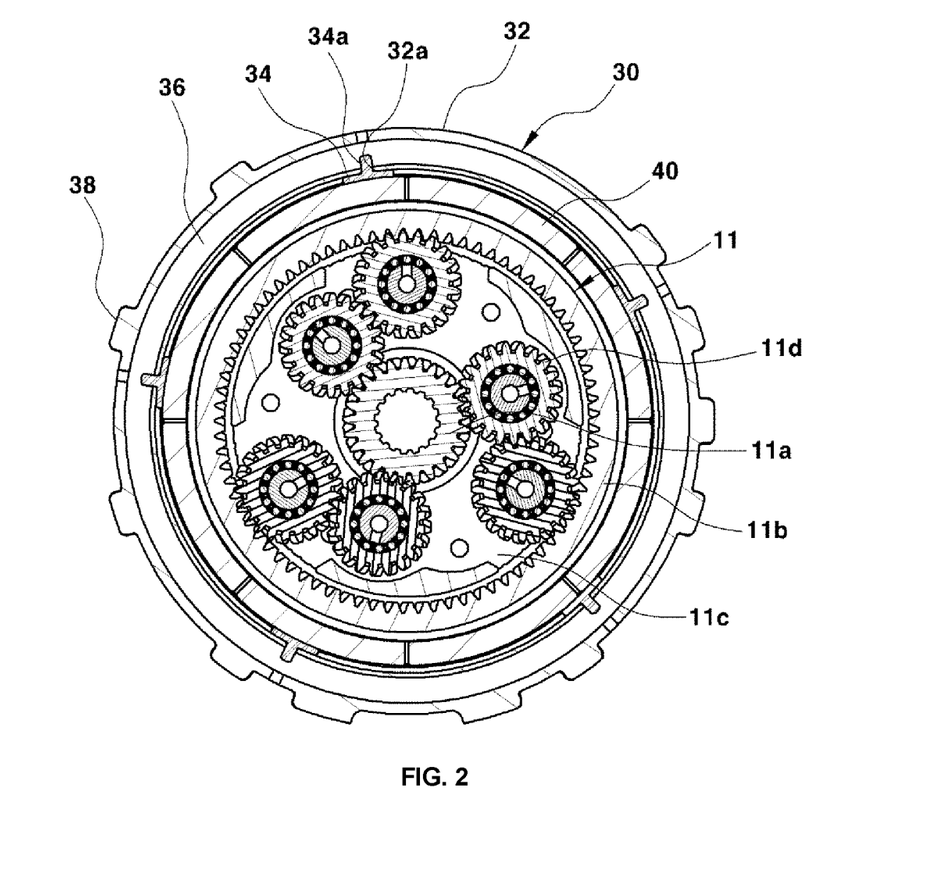
FIG. 2 is a view illustrating the gear support assembled to an outer peripheral surface of a hub retainer.
Figure 3:
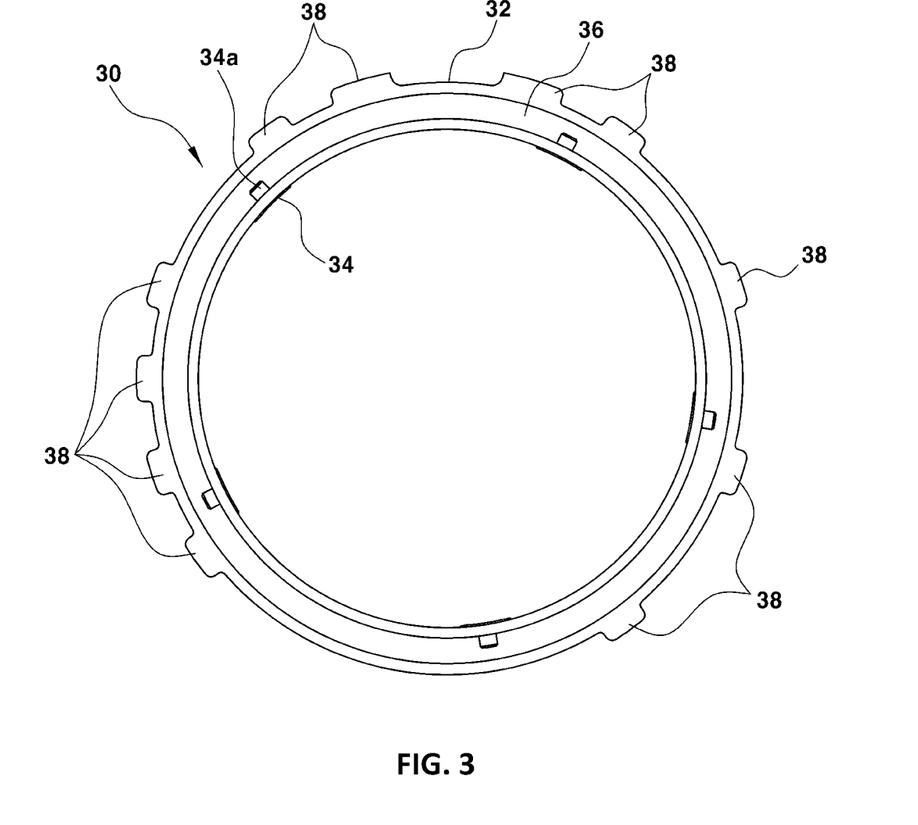
FIG. 3 is a plan view illustrating the gear support according to the exemplary form of the present disclosure.
Figure 4A:
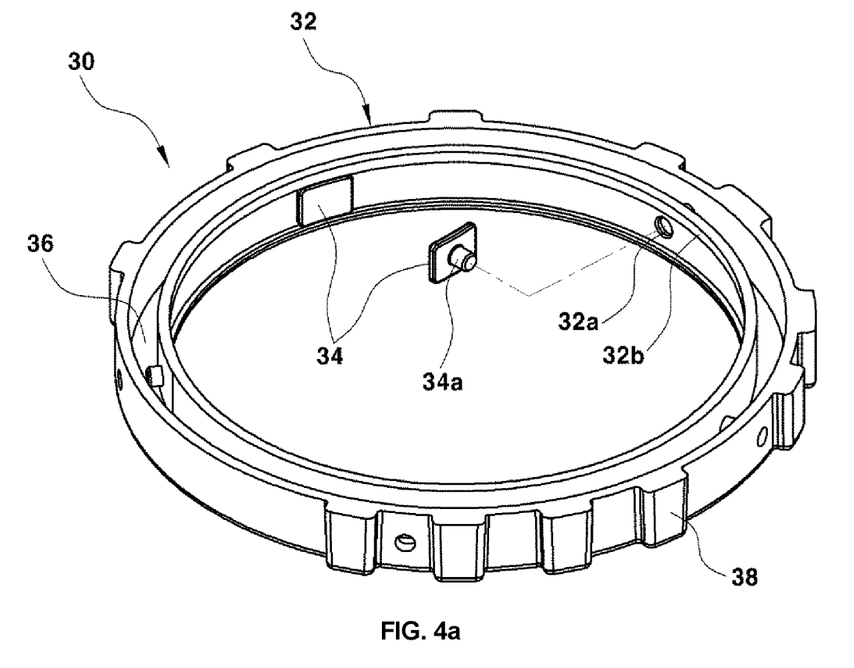
FIG. 4A is a partial exploded perspective view illustrating the gear support according to the exemplary form of the present disclosure.

In the accompanying drawings, FIG. 1 is a partial configuration view illustrating an automatic transmission including a gear support according to an exemplary form of the present disclosure, FIG. 2 is a view illustrating the gear support according to the exemplary form of the present disclosure, assembled to an outer peripheral surface of a hub retainer, FIG. 3 is a plan view illustrating the gear support according to the exemplary form of the present disclosure, and FIG. 4A is a partial exploded perspective view illustrating the gear support according to the exemplary form of the present disclosure.

As illustrated in FIGS. 1 and 2, an automatic transmission includes a gear unit including a plurality of planetary gear sets 10 in order to transmit power supplied from a vehicle driving source, i.e. an engine. In addition, the automatic transmission includes a hub retainer 40 disposed on the peripheral surface of a planetary gear set 11 of the plurality of planetary gear sets 10 and a gear support 30 disposed on the outer peripheral surface of the hub retainer 40, the planetary gear set 11 being disposed in the rear with respect to the engine.

The automatic transmission automatically performs a gear shift by controlling and operating the gear unit including the plurality of planetary gear sets 10. Among the plurality of planetary gear sets 10 constituting the gear unit, the planetary gear set 11 directly coupled to a transmission input shaft 20 to receive engine power is a main cause of noise during the operation of the gear unit.

The planetary gear set 11 is a power transmission device including a sun gear 11a fixed to the transmission input shaft 20 to receive rotation power transmitted from a vehicle driving source, a ring gear 11b connected to a transmission output shaft in a power transmissible manner to output the rotation power transmitted from the sun gear 11a, and a plurality of planetary gears 11d engaged between the sun gear 11a and the ring gear 11b while being rotatably supported by a carrier 11c such that the plurality of planetary gears 11d transmit power. The planetary gear set 11 is disposed in a power transmittable manner between the transmission input shaft 20 and the transmission output shaft while being located inside of the hub retainer 40.

The hub retainer 40 is rotatably coupled together to the carrier 11c of the planetary gear set 11. The hub retainer 40 surrounds the ring gear 11b at a specific distance from the outer peripheral surface of the ring gear 11b. The hub retainer 40 rotates with the carrier 11c as the planetary gear set 11 rotates when power is transmitted.

The gear support 30 is fixed inside of a transmission housing 50 so as not to rotate and is also disposed on the outer peripheral surface of the hub retainer 40 to rotatably support the hub retainer 40. The gear support 30 supports the hub retainer 40 by partial surface contact with the outer peripheral surface of the hub retainer 40 at every specific interval in the circumferential direction of the hub retainer 40, rather than by full contact with the outer peripheral surface of the hub retainer 40.

Specifically, the gear support 30 is disposed around the hub retainer 40 coupled to the planetary gear set 11 to be in surface contact with the outer peripheral surface of the hub retainer 40 at every specific interval, thereby supporting the hub retainer 40 and the planetary gear set 11.

Referring to FIGS. 1 to 4A, the gear support 30 has a body 32 configured to surround the outer peripheral surface of the hub retainer 40 and a plurality of support portions 34 disposed on the inner peripheral surface of the body 32 to be in surface contact with the outer peripheral surface of the hub retainer 40.

The body 32 is in the shape of a ring having an internal diameter slightly greater than an external diameter of the hub retainer 40 to surround the outer peripheral surface of the hub retainer 40 coupled to the planetary gear set 11. The plurality of support portions 34 are disposed on the inner peripheral surface of the body 32 at specific distances from each other.

The plurality of support portions 34 rotatably support the hub retainer 40 fitted into the body 32, by surface contact with the outer peripheral surface of the hub retainer 40. The plurality of support portions 34 respectively have a concavely curved surface in one surface, corresponding to (i.e. being able to be in surface contact with) the outer peripheral surface of the hub retainer 40, and an insert block 34a protruding from the opposite surface, the insert block 34a being able to be fixed to the inner peripheral surface of the body 32.

In other words, the support portion 34 is a plate-shaped member curved in an arc shape having a specific curvature. The support portion 34 has the concave surface configured to be in surface contact with the outer peripheral surface of the hub retainer 40 and the convex surface configured to come into close contact with the inner peripheral surface of the body 32. The insert block 34a to be coupled to the inner peripheral surface of the body 32 is integrally formed on the convex surface of the support portion 34. The concave surface rotatably supports the hub retainer 40 and the planetary gear set 11 by surface contact with the outer peripheral surface of the hub retainer 40 on the inner peripheral surface of the body 32.

A plurality of mounting holes 32a are formed in the inner peripheral surface of the body 32, and the insert blocks 34a are fitted into the mounting holes 32a such that the plurality of support portions 34 are mounted. A guide rail 32b is formed to inhibit or prevent the plurality of support portions 34, mounted through the plurality of mounting holes 32a, from rotating about the insert blocks 34a.

The guide rail 32b protrudes toward the center of diameter (i.e. centrifugal center) of the body 32 by a length less than the thickness of the plurality of support portions 34. The protruding structure of the guide rail 32b inhibits or prevents the plurality of support portions from rotating.

The plurality of mounting holes 32a are formed at specific distances from each other in the inner peripheral surface of the body 32 in the circumferential direction of the body 32. The plurality of mounting holes 32a may be formed at equal distances from each other, in consideration of the plurality of support portions 34 fitted into the plurality of mounting holes 32a.

Referring to FIG. 3, five support portions 34 are mounted to the inner peripheral surface of the body 32, at equal distances from each other in the circumferential direction of the body 32.

As described above, since the plurality of support portions 34 are mounted at specific distances from each other in the body 32, surface contact sections and noncontact sections extending at specific distances are present on the inner peripheral surface of the surface support 30. The surface contact sections indicate sections in which the plurality of the support portions 34 are in surface contact with the hub retainer 40, and the noncontact sections indicate sections in which the plurality of the support portions 34 are not in surface contact with the hub retainer 40. As a result, a contact area with the hub retainer 40 can be considerably reduced, compared to an existing one-way clutch, thereby improving fuel efficiency by reducing a power loss caused by friction with the hub retainer 40 when the planetary gear set 11 rotates.

Here, the plurality of support portions 34 may be formed of a plastic material having better lubrication performance rather than a metal material in order to reduce a friction loss. The body 32 is formed of a specific material, such as aluminum, selected to reduce weight and obtain strength.

In addition, since the plurality of support portions 34 to be in surface contact with the hub retainer 40 are detachably disposed on the body 32 using the insert blocks 34a, it is possible to selectively replace the support portions 34, the replacement of which is frequently desired due to friction in the gear support 30.

Figure 4B:
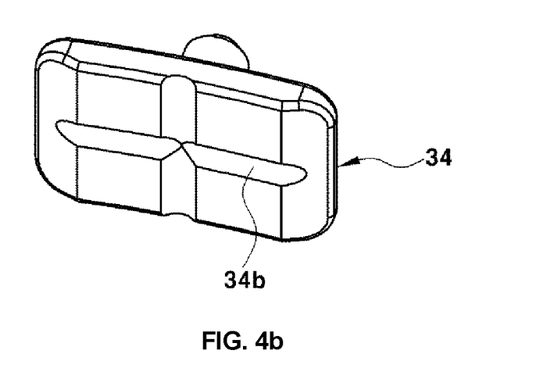
FIG. 4B is a view illustrating a support portion according to another exemplary form of the present disclosure.
Figure 5A:
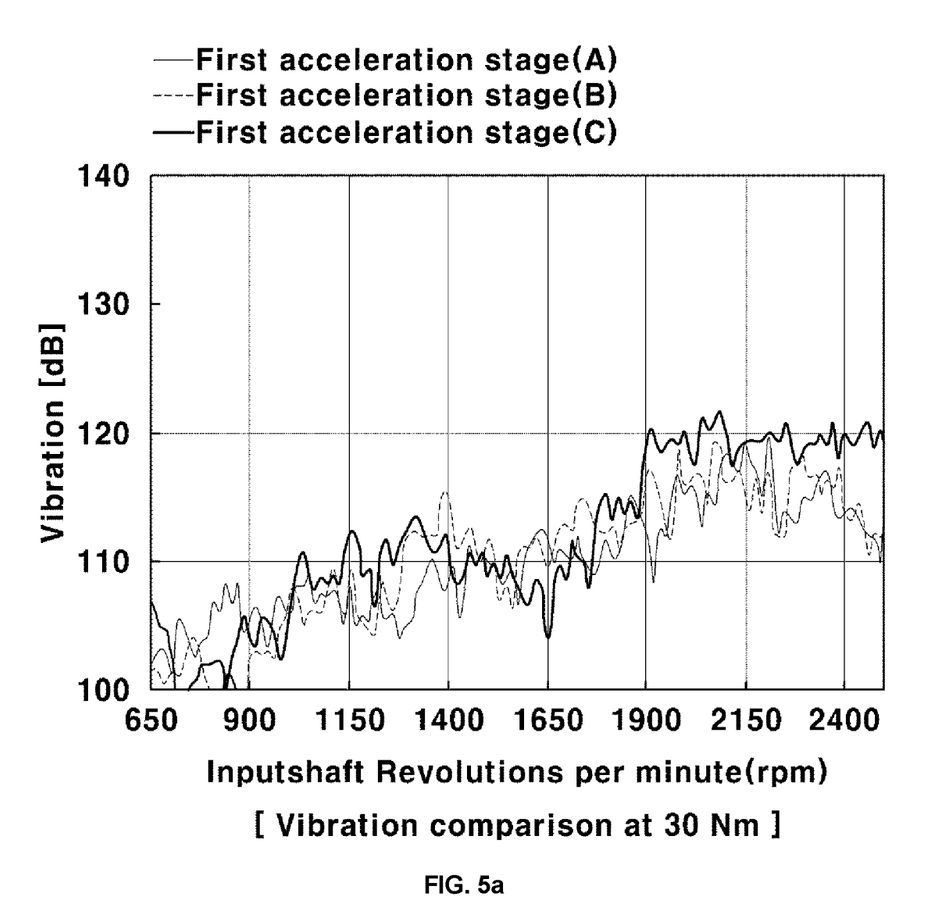
FIGS. 5A to 5D are graphs comparing the vibration reducing performance of a gear support of the present disclosure with the vibration reducing performance of an existing one-way clutch.
Figure 5B:
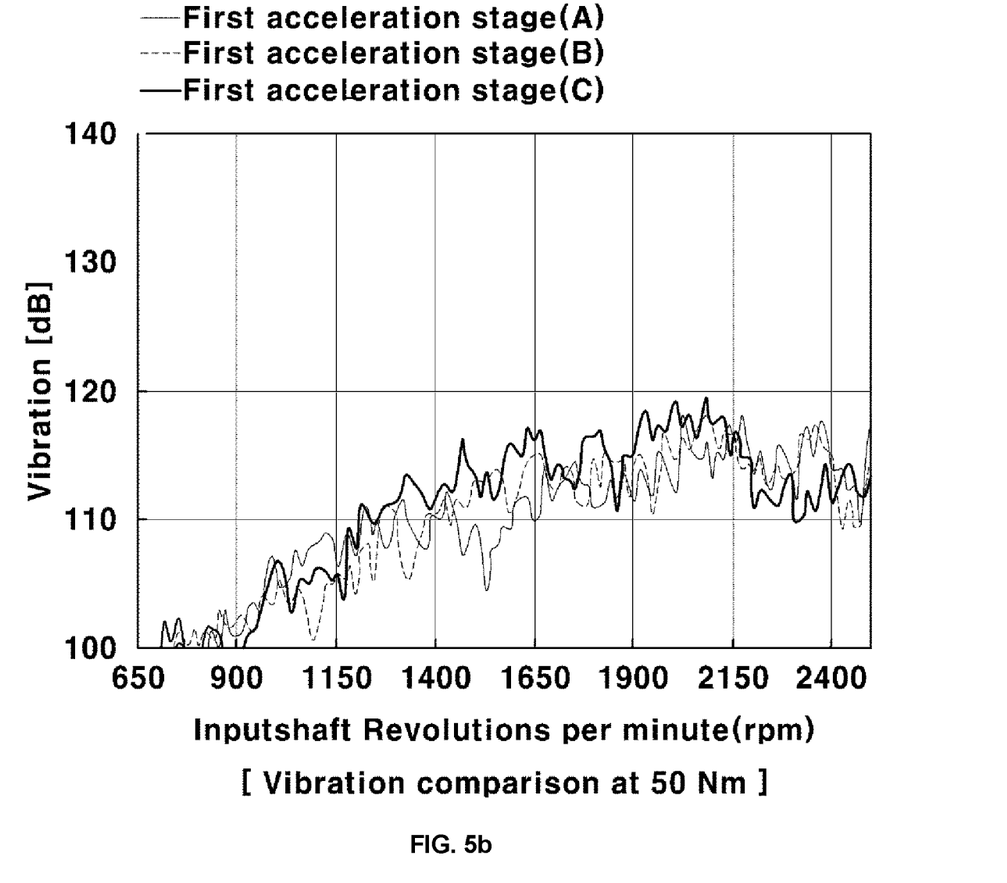
Figure 5C:
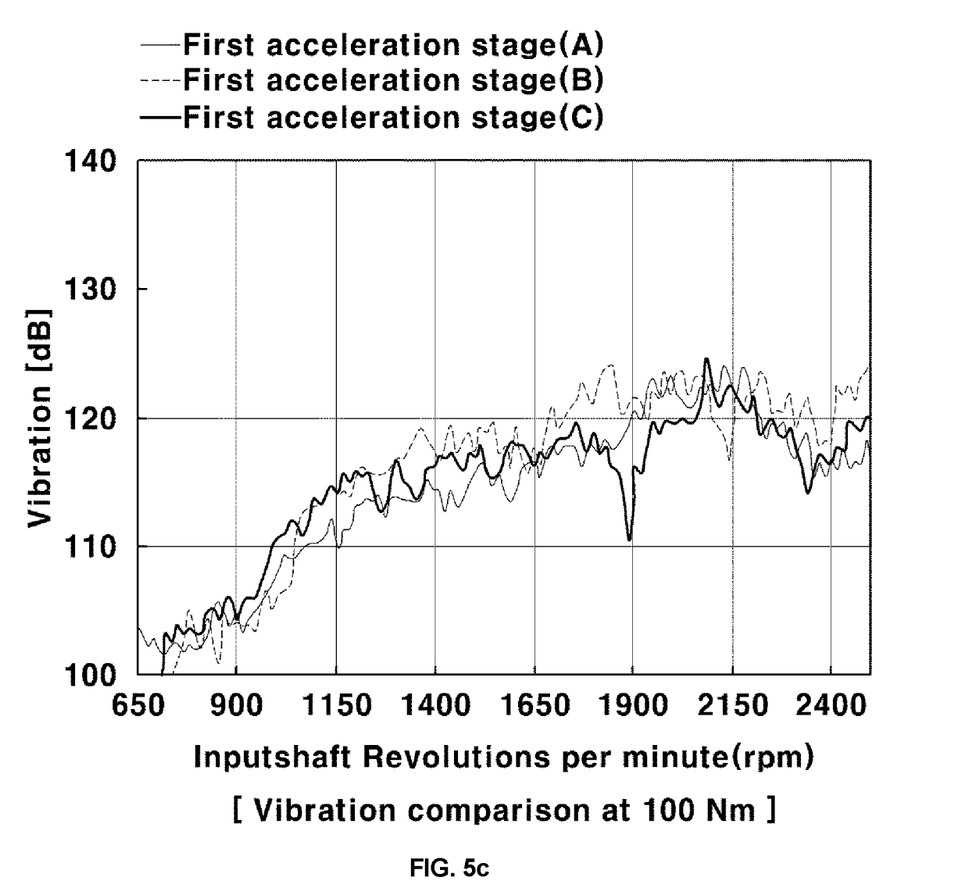
Figure 5D:
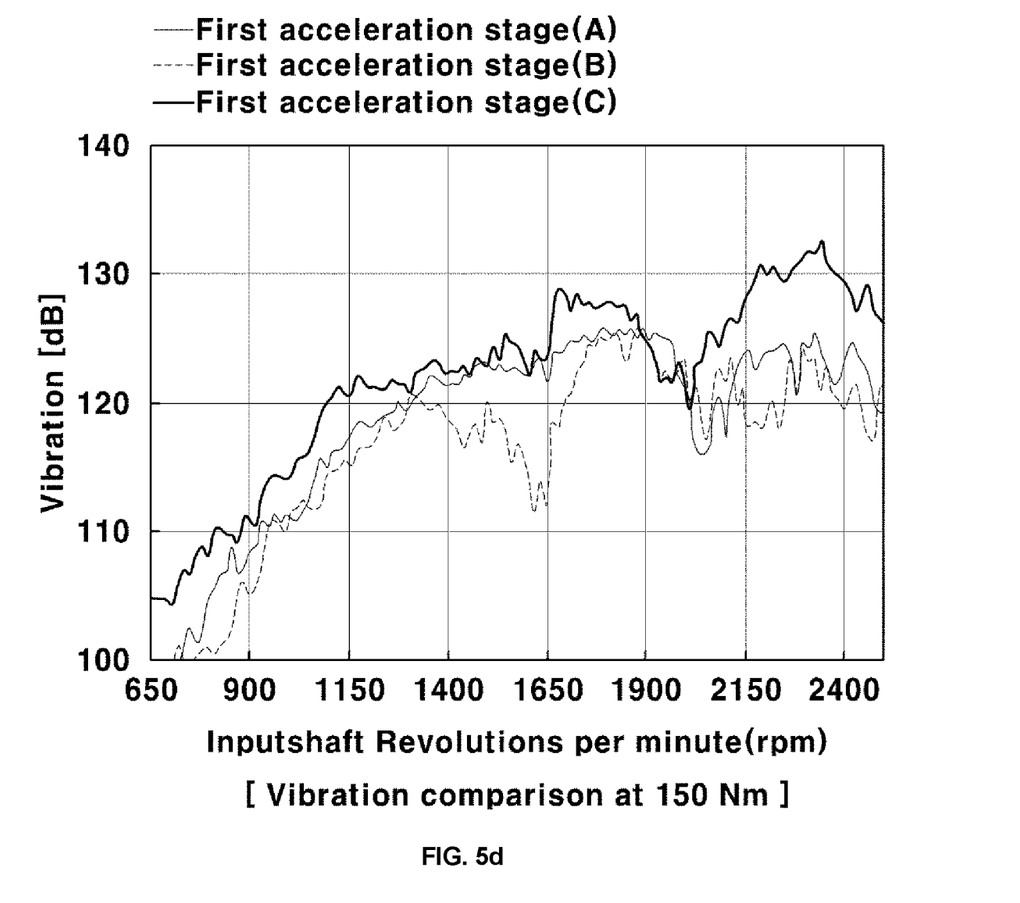

According to another exemplary form illustrated in FIG. 4B, lubrication grooves 34b may be formed in the concave surface of the support portion 34 configured to be in surface contact with the outer peripheral surface of the hub retainer 40.

The lubrication grooves 34b are formed in the shape of a cross in which a first linear groove and a second linear groove cross each other, the first linear groove extending in the circumferential direction of the body 32 across the concave surface of the support portion 34, and the second liner groove extending in the width direction (i.e. the thickness direction) of the body 32. Therefore, lubrication performance of the support portions 34 can be structurally improved to reduce the friction between the support portions 34 and the hub retainer 40 when the planetary gear set 11 rotates.

Here, the shape of the lubrication grooves 34b is not limited to the cross, and the lubrication grooves 34b may be changed to a variety of other shapes.

On the other hand, the body 32 has fixing portions for fixing the gear support 30, including the body 32 and the body 32, to the transmission housing 50.

The fixing portions are a plurality of fixing bosses 38 integrally formed on the outer peripheral surface of the body 32. The plurality of fixing bosses 38 radially protrude from the outer peripheral surface of the body 32.

In addition, in the plurality of the fixing bosses 38 arranged in the circumferential direction of the body 32 to be spaced apart from each other, at least two fixing bosses may have different distances from fixing bosses most adjacent thereto, since the arrangement pattern of the fixing bosses 38 can inhibit the gear support 30 from being attached to the transmission housing 50 in a wrong position.

Groove structures, through which the fixing bosses 38 are inserted, are provided in the transmission housing 50. The fixing portions are fixedly supported by the transmission housing 50 to support the body 32 such that the body 32 is inhibited or prevented from rotating. Accordingly, the planetary gear set 11 and the hub retainer 40 can be balanced and reliably rotate without shaking within the body 32 when the planetary gear set 11 rotates.

Furthermore, the body 32 has a hollow portion 36 provided as an empty space between the inner peripheral surface, to which the support portions 34 are attached, and the outer peripheral surface, on which the fixing portions are provided.

The hollow portion 36 is in the shape of a ring concentric with the body 32, extending along the circumference of the body 32. The weight of the body 32 is reduced due to the hollow portion 36.

As illustrated in FIGS. 1 to 4A, the hollow portion 36 may have one surface open. In this case, the body 32 has a U-shaped cross-section when cut in the diameter direction thereof.

Since the gear support 30 as configured above reliably supports the hub retainer 40, it is possible to reduce or prevent torsion from occurring in the carrier 11c of the planetary gear set 11 (the carrier 11c rotatably supporting planetary gears 11d) when power input from the vehicle driving source (such as an engine or a motor) is transmitted to the planetary gear set 11, more particularly, to the planetary gears 11d of the planetary gear set 11. Consequently, engagement between the gear members of the planetary gear set 11 can be stabilized, thereby reducing vibration and noise caused by the operation of the planetary gear set 11 when power is transmitted.

In the case in which the function of an existing one-way clutch for preventing the reverse rotation of the planetary gear set 11 when the automatic transmission is shifted to a first shift stage is implemented using a different technology (for example, using a gear shift control process), the gear support 30 can substitute for the exiting one-way clutch supporting the planetary gear set 11, thereby reducing the manufacturing costs and weight of a vehicle by removing the expensive and heavy one-way clutch.

That is, the gear support 30 can substitute for the existing one-way clutch that is relatively expensive and heavy, thereby reducing the manufacturing costs and the weight of the vehicle as well as reducing vibration and noise in the planetary gear set 11 to the same level as in the existing one-way clutch.

Hereinafter, the vibration reducing performance of the gear support of the present disclosure will be compared with the vibration reducing performance of an existing one-way clutch with reference to FIGS. 5A to 5D.

For the comparison between the vibration reducing performance of the gear support and the vibration reducing performance of the existing one-way clutch, vibration of planetary gear sets was measured in the same conditions, by respectively disposing the gear support and the exiting one-way clutch on the peripheral surface of a hub retainer of an automatic transmission. In addition, vibration in the planetary gear set was measured in the condition in which all of the gear support and the exiting one-way clutch were removed from the peripheral surface of the hub retainer.

Vibration in the planetary gear set was measured when different levels of engine power of 30 Nm, 50 Nm, 100 Nm, and 150 Nm were transmitted at a first shift (acceleration) stage, regarding case A in which the existing one-way clutch was disposed on the outer peripheral surface of the hub retainer, case B in which the gear support of the present disclosure was disposed on the outer peripheral surface of the hub retainer, and case C in which neither the existing one-way clutch nor the gear support was disposed on the outer peripheral surface of the hub retainer. As illustrated in FIGS. 5A to 5D, it can be appreciated that vibration in the planetary gear set in case B, in which the gear support was provided, was reduced compared to case C, in which neither the existing one-way clutch nor the gear support was provided, by an average level equal to or greater than the level of vibration reduced by case A, in which the one-way clutch was provided.

In particular, it can be appreciated that the vibration reducing efficiency of the planetary gear set is more significant at the high-torque power level of 150 Nm, at which a relatively greater amount of vibration occurs, than at the other power levels of 30 Nm, 50 Nm, or 100 Nm, at which relatively smaller amounts of vibration occur.

The above-described evaluation results demonstrate that, when the hub retainer of the automatic transmission is supported using the gear support of the present disclosure, the function of supporting the planetary gear set can be implemented by a level equal to or higher than the function of supporting the planetary gear set provided by the existing one-way clutch. It is also possible to reduce vibration and noise occurring in the planetary gear set during transmission of power.

Although the exemplary forms of the present disclosure have been described for illustrative purposes, those skilled in the art will appreciate that various modifications, additions and substitutions are possible, without departing from the scope and spirit of the present disclosure.

What is claimed is:

1. A gear support device of an automatic transmission, comprising:
   a gear support disposed on an outer peripheral surface of a hub retainer coupled to a planetary gear set, the gear support configured to support the hub retainer,
   wherein the gear support includes:
      a body configured to surround the outer peripheral surface of the hub retainer, and
      a plurality of support portions provided on an inner peripheral surface of the body and arranged at predetermined intervals in a circumferential direction of the hub retainer,
   wherein the body has fixing portions configured to fix the body to a transmission housing, and
   wherein support portions of the plurality of support portions are configured to respectively support the hub retainer by maintaining surface contacts between the support portions and the outer peripheral surface of the hub retainer.

2. The gear support device according to claim 1, wherein the body has mounting holes in the inner peripheral surface of the body, the mounting holes configured to allow the plurality of support portions to be mounted to the body, and the plurality of support portions respectively have an insert block on one side thereof, the plurality of insert blocks being fitted into the mounting holes.

3. The gear support device according to claim 2, wherein the body has a guide rail provided on the inner peripheral surface thereof to inhibit the plurality of support portions from moving.

4. The gear support device according to claim 1, wherein the body has a hollow portion between the inner peripheral surface of the body and an outer peripheral surface of the body.

5. The gear support device according to claim 1, wherein the fixing portions comprise a plurality of fixing bosses disposed on an outer peripheral surface of the body to be spaced apart from each other.

6. The gear support device according to claim 5, wherein among the plurality of fixing bosses, a distance between a first fixing boss and a second fixing boss, which is most adjacent to the first fixing boss, is different from a distance between other fixing bosses.

7. The gear support device according to claim 1, wherein each of the plurality of support portions has a lubrication groove configured to reduce friction, the lubrication groove formed on a surface of the plurality of support portions, and
   wherein the surfaces formed with the lubrication groove are in surface contact with the outer peripheral surface of the hub retainer.

8. The gear support device according to claim 1, the support portions have a concavely curved surface corresponding to the outer peripheral surface of the hub retainer, and the curved surfaces are configured to be in surface contact with the outer peripheral surface of the hub retainer to rotatably support the hub retainer.

\* \* \* \* \*